United States Patent [19]
Izumi et al.

[11] Patent Number: 5,495,792
[45] Date of Patent: Mar. 5, 1996

[54] DOUBLE ACTING HYDRAULIC CYLINDER WITH IMPROVED LUBRICATION AND PISTON ROD GUIDES

[75] Inventors: Akira Izumi; Toshiyuki Takeuchi, both of Kariya, Japan

[73] Assignee: Kabushiki Kaisha Toyoda Jidoshokki Seisakusho, Kariya, Japan

[21] Appl. No.: 256,325

[22] PCT Filed: Nov. 10, 1993

[86] PCT No.: PCT/JP93/01630

§ 371 Date: Sep. 30, 1994

§ 102(e) Date: Sep. 30, 1994

[87] PCT Pub. No.: WO94/11232

PCT Pub. Date: May 26, 1994

[30] Foreign Application Priority Data

Nov. 10, 1992 [JP] Japan .................................... 4-300180

[51] Int. Cl.$^6$ .................................................. F16J 15/18
[52] U.S. Cl. .............................. 92/166; 92/164; 92/168; 92/165 R
[58] Field of Search ................ 92/163, 164, 165 R, 92/166, 168

[56] References Cited

U.S. PATENT DOCUMENTS

| | | | |
|---|---|---|---|
| 3,088,757 | 5/1963 | McIntosh | 92/164 |
| 3,108,511 | 10/1963 | Benjamin et al. | 92/164 |
| 3,171,328 | 3/1965 | Hennells | 92/168 |
| 3,311,030 | 3/1967 | Halstead | 92/168 |
| 3,480,100 | 11/1969 | Gaulke . | |
| 3,559,540 | 2/1971 | Sheldon | 92/168 |
| 5,094,312 | 3/1992 | Hakel . | |

FOREIGN PATENT DOCUMENTS

| | | |
|---|---|---|
| 0075426 | 3/1983 | European Pat. Off. . |
| 55-79756 | 6/1980 | Japan . |
| 59-226703 | 12/1984 | Japan . |
| 62-21661 | 5/1987 | Japan . |
| 62-121403 | 6/1987 | Japan . |
| 213762 | 1/1990 | Japan . |
| 239969 | 3/1990 | Japan . |
| 2109773 | 4/1990 | Japan . |

OTHER PUBLICATIONS

European Search Report for Appln. No. EP 93 92 4795.

*Primary Examiner*—Thomas E. Denion
*Attorney, Agent, or Firm*—Brooks Haidt Haffner & Delahunty

[57] ABSTRACT

Disclosed is a double piston rod type hydraulic cylinder having a pair of pressure chambers containing piston rods that reciprocate in response to changes of the pressure of hydraulic fluid contained in both pressure chambers. This hydraulic cylinder is used in, for example, a rear axle steering cylinder for industrial vehicles utilizing hydraulic power steering. Bushings are provided between the piston rod and a pair of rod guides that permit the sliding of the piston rod. Oil grooves are formed in the inner surfaces of the rod guide to connect oil inlet ports to the pressure chambers.

18 Claims, 4 Drawing Sheets

5,495,792

DOUBLE ACTING HYDRAULIC CYLINDER WITH IMPROVED LUBRICATION AND PISTON ROD GUIDES

TECHNICAL FIELD

The present invention relates to a double piston rod type hydraulic cylinder in which piston rods, provided in a pair of pressure chambers, reciprocate due to varying hydraulic fluid pressures in both compression chambers. More particularly, the invention relates to a hydraulic cylinder suitable for an axle cylinder used with industrial vehicles having a hydraulic power steering system.

TECHNICAL BACKGROUND

Industrial vehicles, such as fork lift trucks, are typically driven in a reverse direction and frequently make tight turns. The conventional steering mechanism of such vehicles utilize the vehicle's rear wheels for turning the vehicle in a left or right direction and oftentimes incorporate hydraulic power steering to reduce the effort required by the driver to steer the vehicle. In particular such systems utilize a hydraulic rear axle cylinder.

FIG. 5 illustrates a rear axle cylinder 51 that has a hydraulic fluid filled cylinder tube 52 having gray cast iron rod guides 53 and 54 attached at both ends. A piston rod 55, supported by rod guides 53 and 54 in the cylinder tube 52, reciprocates in a rightward and leftward direction. Both end portions of the piston rod 55 are coupled to the vehicle's rear wheels via tie rods, knuckles or the like (not shown). Upon movement of the piston rod 55 leftward, the piston's motion is converted to the turning motion of the rear wheels via the tie rods, knuckles, etc.

Pressure chambers 57 and 58 are defined in the cylinder tube 52 by a piston 56 mounted on the outer surface of the piston rod 55. An oil inlet port 59 formed in the left rod guide 53 is connected to a hydraulic pump via a piping 60, and to the pressure chamber 57 via an oil passage 61. Likewise, an oil inlet port 62, formed in the right rod guide 54, is connected to the hydraulic pump via a piping 63 and to the pressure chamber 58 via an oil passage 64. When the hydraulic pump supplies hydraulic fluid to the pressure chamber 57 via the combination of the piping 60, the oil inlet port 59 and the oil passage 61, the hydraulic fluid in the pressure chamber 58 is discharged via the oil passage 64, the oil inlet port 62 and the piping 63. This causes the rightward movement of the piston rod 55.

Each of the oil passages 61 and 64 is formed having a vertical hole 65, an oblique hole 66 and an annular groove 67. The vertical hole 65 extends inward in the radial direction of the rod guide 53 or 54 from the oil inlet port 59 or 62. The annular groove 67 is formed entirely in the inner wall of each of the rod guides 53 and 54. The oblique hole 66 is formed in each of the rod guides 53 and 54, and connects the vertical hole 65 to the annular groove 67. This structure is employed both to widen as much as possible the area of portions C where the piston rod 55 slides against the rod guides 53 and 54, and to make the rod guides 53 and 54 more compact.

More specifically, if the oil passages 61 and 64 are formed each having only the vertical hole 65 and the annular groove 67, as indicated by the broken lines in FIG. 5, the surface area of the portions C where the piston rod 55 slides against the rod guides 53 and 54 decreases. Accordingly, when a force is applied to the piston rod 55 from the tie rod in a direction perpendicular to the moving direction of the piston rod 55 (i.e. an up and down direction), such a force cannot easily be distributed over the decreased slide-contact portion C. This impairs the smooth movement of the piston rod 55 in the cylinder tube 52.

One solution to this problem, is to increase the thicknesses of rod guides 53 and 54 (in the right and left direction) in order to widen the areas of the slide-contact portions C. This however enlarges the rod guides 53 and 54, and makes the rear axle cylinder 51 larger and heavier.

According to the above prior art, the oblique holes 66 are formed midways along the oil passages 61 and 64 in order to increase the surface area of the contact portions C without making the rod guides 53 and 54 thicker. Accordingly, when a force perpendicular to the moving direction of the piston rod 55 is applied to the rod 55, the force is easily distributed over the slide-contact portion C. This allows the piston rod 55 to slide smoothly, in the cylinder tube 52 without making the rear axle cylinder 51 larger or heavier.

Currently, during the manufacture of the rod guides 53 and 54 which incorporate the oil passages 61 and 64, it is relatively easy to form vertical hole 65 and annular groove 67. On the other hand, it is relatively difficult to form the oblique hole 66 in such a way that accurately aligns and links the hole 66 to the vertical hole 65. Conventional formation of the oblique hole 66 requires complex steps and high-precision processing technology. This complicates the production of the rear axle cylinder 51 and increases the manufacturing cost.

Further, the rod guides 53 and 54 should satisfy the following conditions:

(1) Although rod guides 53 and 54 are in direct contact with the piston rod 55, it is generally undesirable that such contact either damage or cause premature wearing of the sliding piston rod 55. The rod guides 53 and 54 should therefore be made of a material having a lower rigidity and smaller frictional coefficient than the piston rod 55.

(2) To support the piston rod 55 in a slidable manner, the rod guides 53 and 54 should have a sufficient strength.

The conventional material used for constructing rod guides 53 and 54, i.e., gray cast iron, however cannot satisfy the requirements of the first and second conditions. Consequently, the piston rod 55 is likely to be damaged or its contact portions easily worn out by the sliding motion of piston rod 55. That is, the conventional piston rod 55 does not exhibit good durability characteristics.

The present invention has been accomplished with a view to solving the above disadvantages. It is an object of the present invention to provide a hydraulic cylinder incorporating a piston rod with enhanced durability characteristics in order to decrease the damage or wear to the piston rod caused by its sliding motion and to decrease the costs associated with the manufacturing of the hydraulic cylinder.

DISCLOSURE OF THE INVENTION

According to this invention, there is provided a hydraulic cylinder comprising a cylinder tube, a pair of rod guides provided at both ends of the cylinder tube, respectively; a piston rod, inserted in the cylinder tube and the rod guides, reciprocatable in accordance with pressures of hydraulic fluids in a pair of pressure chambers; bushes respectively provided between the piston rod and the rod guides for permitting sliding of the piston rod; oil inlet ports, provided on the rod guides, for connecting outer surfaces of the rod guides to inner surfaces thereof, the oil inlet ports being connected to an external device; and oil grooves, formed in at least one of the inner surface of each of the rod guides and an outer surface of each of the bushes, the oil grooves constituting oil passages for connecting the oil inlet ports to the pressure chambers between the rod guides and the bushes. Accordingly, it is possible to prevent damage and wear to the piston rod due to its sliding motion in a way that improves the rod's durability and decreases manufacturing costs of the hydraulic cylinder.

The rod guides are made of gray cast iron, and the bushes are made of a fluororesin. Such materials reduce the damage and wear to the piston rods. This is in marked contrast to the case where the bushes are formed of a metal material.

The oil grooves include a first oil groove formed in the inner surface of each of the rod guides and extending in a circumferential direction, and a second oil groove formed along an axis of the piston rod for connecting the first oil groove to one of the pressure chambers. The first oil groove is entirely formed in the inner surface of each of the rod guides. To connect the oil inlet ports to the pressure chambers via a plurality of passages, for example, a plurality of second oil grooves should be provided in such a manner that the adjoining second oil grooves are set apart from each other at a predetermined angle. This design allows the structures of the oil passages to be simplified.

The first oil groove is formed in an arc shape in the inner surface of each of the rod guides. This allows the first oil groove to be formed more easily than were it to have a ring shape.

A plurality of second oil grooves are provided symmetrical to the axis of the piston rod. This allows an even flow of hydraulic fluid between the oil inlet ports and the pressure chambers. Each of the second oil grooves are formed 90 degrees apart from an opening portion of the oil inlet ports in a corresponding first oil groove. Although a plurality of oil passages are provided for each rod guide, the hydraulic fluid has a nearly even flow in each passage. The second oil grooves also connect an opening portion of each of the oil inlet ports in the inner surface of each of the rod guides with one of the pressure chambers. It is therefore possible to simplify the design of the oil passages and to easily perform any work which the oil passages may require.

Oil and dust seals are provided between the rod guides and the piston rod on a side opposite to the pressure chambers with the bushes placed therebetween. The oil seals prevent hydraulic fluids in the pressure chambers from leaking outside of the rod guides. The dust seals prevent dust from entering the pressure chambers from outside the rod guides.

The hydraulic cylinder is used in a hydraulic power steering system for a vehicle, the cyinder tube is attached to an axle beam of the vehicle, and both ends of the piston rod are coupled to the vehicle's wheels. With this structure, even if a force perpendicular to the reciprocating direction of the piston rod is applied to the piston rod during steering operations, the force can be evenly distributed by the bushes allowing the piston rod to reciprocate smoothly.

BEST MODE FOR CARRYING OUT THE INVENTION

The present invention will now be described in more detail with reference to the accompanying drawings.

Figure 4:
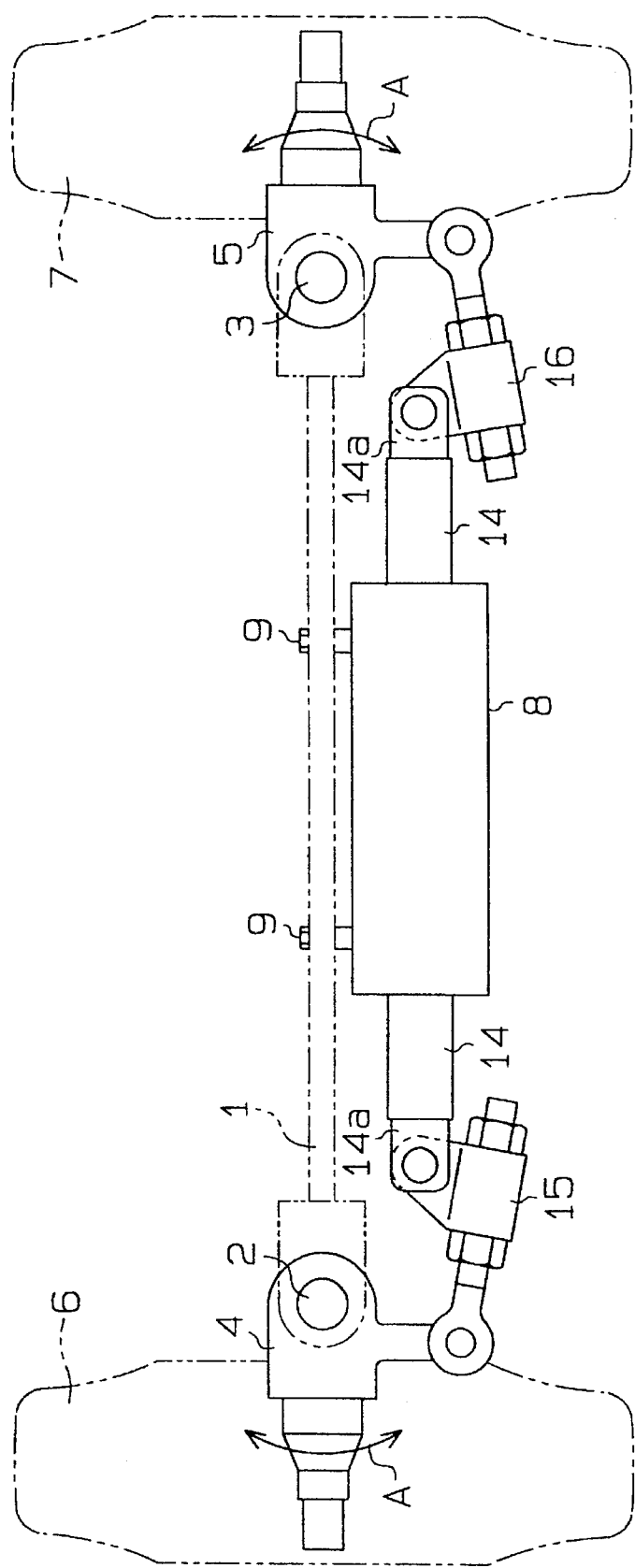
FIG. 4 is a plan view showing the essential portions of a device for performing steering operation of rear wheels.
Figure 5:
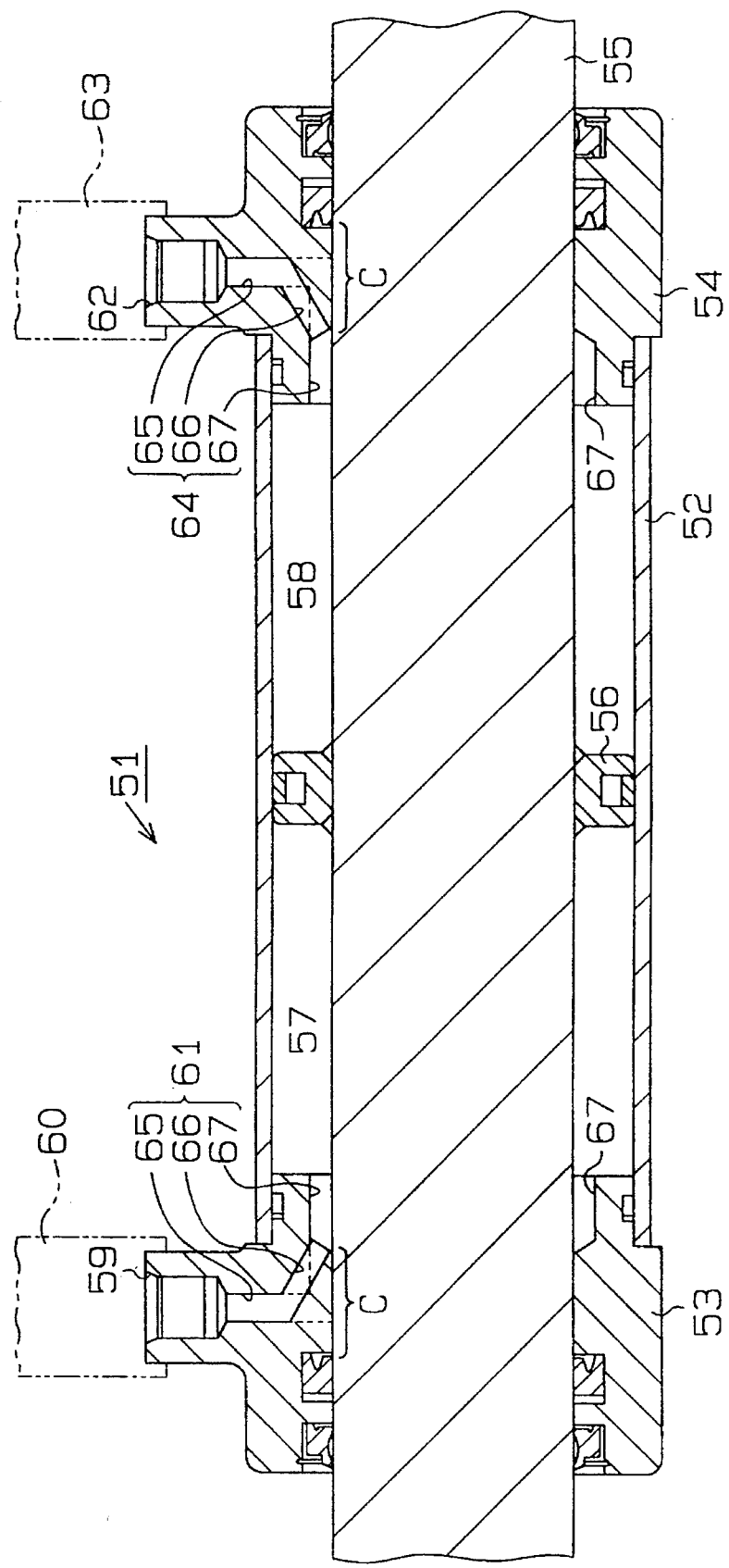
FIG. 5 is a longitudinal cross-sectional view of a conventional rear axle cylinder.

As shown in FIG. 4, an industrial vehicle, such as a fork lift truck, is provided with a rear axle beam 1. The rear axle beam 1 is supported at the center and is movable in the right and left direction. In FIG. 4, only a part of the rear axle beam 1 is schematically shown in a chain line. Knuckles 4 and 5 are supported at left and right ends of the rear axle beam 1 via king-pins 2 and 3 in such a way as to be rotatable in the direction of the arrow A. Rear wheels 6 and 7 are supported on the respective knuckles 4 and 5.

The vehicle is provided with a steering mechanism for turning both rear wheels 6 and 7 to turn the vehicle rightward or leftward as needed. To reduce the effort required by the driver to steer the vehicle, a hydraulic power steering system is installed. A rear axle cylinder 8, which is a double acting double piston rod type hydraulic cylinder, is used for a part of the power steering system. The rear axle cylinder 8 is secured to the center portion of the rear axle beam 1 by bolts 9.

Figure 1:
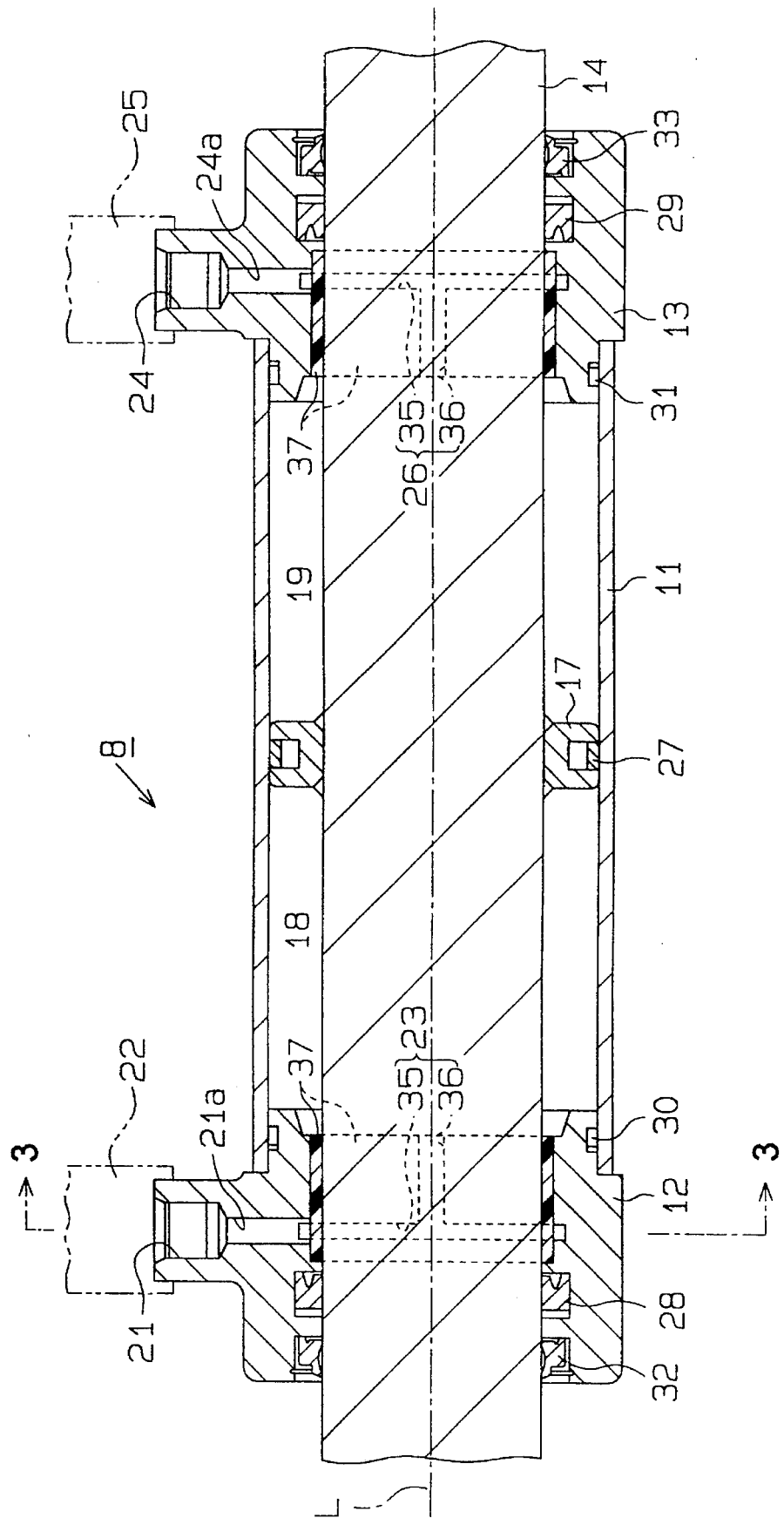
FIG. 1 is a plan cross-sectional view of a rear axle cylinder according to a hydraulic cylinder embodying the present invention.

As shown in FIG. 1, the rear axle cylinder 8 has a cylinder tube 11 having openings at both ends. Rod guides 12 and 13 of gray cast iron are attached to the open ends of the cylinder tube 11, respectively. A piston rod 14 is inserted in the cylinder tube 11, and the rod guides 12 and 13 so as to be reciprocatable in the right and left directions. The cylinder tube 11, the rod guides 12 and 13 and the piston rod 14 define an annular space.

As shown in FIGS. 1 and 4, the piston rod 14 protrudes in the right and left direction relative to the cylinder tube 11, with clevis-like extending portions 14a respectively formed at both ends of the piston rod 14. The extending portions 14a are coupled to the knuckles 4 and 5 by tie rods 15 and 16, respectively. The reciprocating motion of the piston rod 14 is converted to the turning motion of both rear wheels 6 and 7 through the tie rods 15 and 16 and the knuckles 4 and 5, and allows the vehicle to change driving directions.

As shown in FIG. 1, a ring-shaped piston 17 is secured to the outer surface of the piston rod 14. This piston 17 reciprocates rightward and leftward together with the piston rod 14. The annular space inside the cylinder tube 11 is defined as a pair of pressure chambers 18 and 19 by the piston 17. Both pressure chambers are filled with a high-pressure hydraulic fluid.

Provided on the left rod guide 12 is an oil inlet port 21 which is open to the outer surface. A piping 22 is connected to the oil inlet port 21. The oil inlet port 21 has a radially extending vertical hole 21a that opens to the inner surface of the rod guide 12. This vertical hole 21a communicates with the left pressure chamber 18 via an oil passage 23. Likewise, a piping 25 is connected to an oil inlet port 24 of the right rod guide 13, and a vertical hole 24a extending in the radial direction communicates with the right pressure chamber 19 via an oil passage 26. A hydraulic pump, a control valve, a reservoir tank, etc. (not shown) are connected as external devices to the pipings 22 and 25.

A piston ring 27 is mounted around the piston 17. This ring 27 is pressed against the inner surface of the cylinder tube 11 to prevent the leakage of hydraulic fluid between the pressure chambers 18 and 19. Oil seals 28 and 29 are provided between the rod guides 12 and 13 and the piston rod 14, respectively. Oil seals 30 and 31 are provided between the rod guides 12 and 13 and the cylinder tube 11, respectively. The oil seals 28 to 31 prevent hydraulic fluids in the pressure chambers 18 and 19 from leaking outside the rear axle cylinder 8 via the respective rod guides 12 and 13.

Dust seals 32 and 33 are provided between the rod guides 12 and 13 and the piston rod 14, near the oil seals 28 and 29. The dust seals 32 and 33 inhibit dust from entering the pressure chambers 18 and 19 from outside the rear axle cylinder 8.

Figure 2:
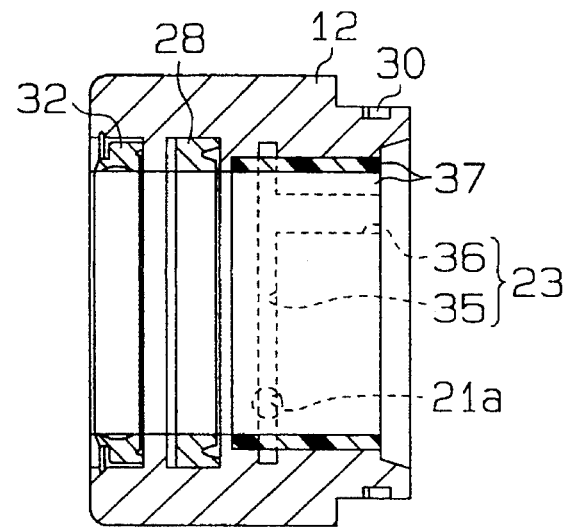
FIG. 2 is a longitudinal cross-sectional view of a rod guide.

Each of the oil passages 23 and 26 has a single first oil groove 35, a pair of second oil grooves 36 and a single bush 37 as shown in FIGS. 1 and 2. The first oil groove 35 is formed in an annular shape entirely in the inner surface of each of the rod guides 12 and 13. The second oil grooves 36 extend in parallel to the axis, L, of the piston rod 14 on the inner surface of each of the rod guides 12 and 13. Both ends of each second oil groove 36 are perpendicularly connected to the first oil groove 35 and the pressure chambers 18 and 19.

Figure 3:
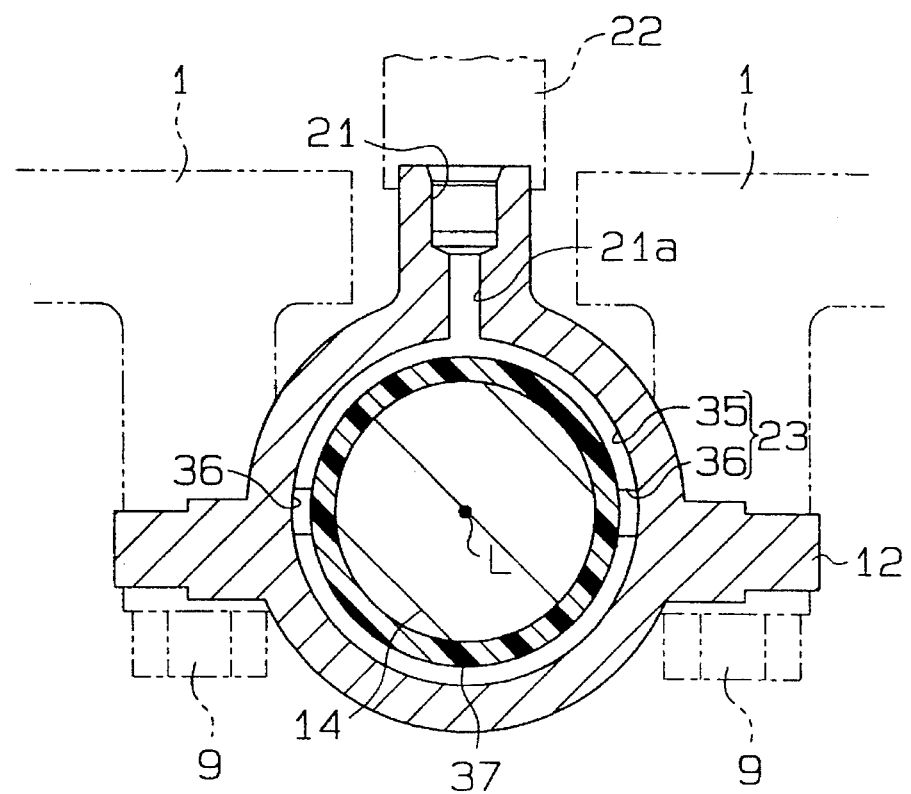
FIG. 3 is a cross-sectional view taken along the line 3—3 in FIG. 1.

As shown in FIG. 3, the portion of each second oil groove 36 which connects to the first oil groove 35 is located 90 degrees apart from the opening of the oil inlet port 21 or 24 to the first oil groove 35. Effectively, both second oil grooves 36 are formed symmetrical to the axis L of the piston rod 14.

The bush 37 has a cylindrical shape and is press fit in the associated rod guide 12 or 13. The bush 37 is formed of a material which has a lower rigidity and a lower frictional coefficient than gray cast iron. This material, polytetrafluoroetylene (PTFE), is a kind of fluororesin used in this embodiment. The outer walls of the bush 37 serves as the inner walls of the first oil groove 35 and the second oil grooves 36 and thus form the oil passages 23 and 26. The inner wall of the bush 37 is a slide-contact surface for permitting the piston rod 14 to slide.

According to the thus constituted embodiment, when the steering wheel is at the neutral position, the hydraulic fluid from the hydraulic pump is supplied to both pressure chambers 18 and 19, equalizing the fluid pressures in the pressure chambers 18 and 19. This prevents steering power from acting on both rear wheels 6 and 7.

A description will now be given of the case where the driver turns the steering wheel in a predetermined direction from a straight forward direction. First, the hydraulic fluid supplied from the hydraulic pump is fed to the oil inlet port 21 via the left piping 22. This flow of the hydraulic fluid branches in two directions at the point where the oil inlet port 21 connects to the first oil groove 35. After the hydraulic fluids flow a similar distance in the opposite directions along the oil groove 35, the hydraulic fluids reach connecting portions to both second oil grooves 36. The hydraulic fluids then flow along both second oil grooves 36 and reach the pressure chamber 18. The hydraulic fluid in the right pressure chamber 19 flows along both second oil grooves 36 and reaches a connecting portion to the first oil groove 35. The hydraulic fluids are combined at the oil inlet port 24 and return to the reservoir tank via the piping 25. At this time, fluid pressure applied to the left pressure chamber 18 forces the piston rod 14 rightward, effectively reducing the effort required by the driver to steer the vehicle.

When the steering wheel is turned in the opposite direction from that previously described, the rear axle cylinder 8 functions in a way similar to that described above but in the opposite way. Its detailed description will not be given below.

According to this embodiment, the two second oil grooves 36, provided for each of the rod guides 12 and 13, are separated 90 degrees apart from the opening portions of the oil inlet ports 21 and 24 in the first oil groove 35. That is, a pair of second oil grooves 36 are formed on both sides of the oil inlet ports 21 and 24. When the hydraulic fluid flows between the oil inlet port 21 and the pressure chamber 18 or when the hydraulic fluid flows between the oil inlet port 24 and the pressure chamber 19, the hydraulic fluids will flow through the second oil grooves 36. Both second oil grooves 36 are provided symmetrical to the axis L of the piston rod 14. This allows the even flow of hydraulic fluid between the oil inlet ports 21 and 24 as well as the pressure chambers 18 and 19. The piston rod 14 therefore moves smoothly ensuring excellent power steering operation.

According to this embodiment, the first oil groove 35 and second oil grooves 36 are formed in the inner surface of each of the rod guides 12 and 13. The inner sides of the oil grooves 35 and 36 are closed by the bushes 37, and the piston rod 14 is slidably supported by the rod guides 12 and 13 via those bushes 37. In other words, the oil passages 23 and 26 where the hydraulic fluids flow are separated from the portions that support the piston rod 14.

Therefore, the areas constituting support portions (inner surfaces of the bushes 37) of the rod guides 12 and 13 for the piston rod 14 are unrestricted by the oil passages 23 and 26. This allows those areas to have sufficiently wide widths. Even if a force perpendicular to the moving direction of the piston rod 14 (i.e., in the up and down direction relative to FIG. 4) is applied to the piston rod 14 from the tie rods 15 and 16, such a force would be evenly distributed by the bushes 37, allowing the piston rod 14 to have a smooth sliding movement.

Moreover, it is unnecessary to elongate both rod guides 12 and 13 in order to widen the above areas. As a result, the rod guides 12 and 13 can be formed in a way that avoids any increase in the size and weight of the rear axle cylinder 8.

Further, the first oil groove 35, formed in the inner surface of the rod guide 12 or 13, constitutes a part of the oil passage 23 or 26, and extends in the circumferential direction of guides 12 or 13. The second oil grooves 36, which constitute a part of the oil passage 23 or 26, extends along the inner surface of the rod guide 12 or 13, parallel to the axis L of the piston rod 14. The oblique holes as in the prior art are not formed. The first oil groove 35 can be machined in the process of forming attachment grooves which receive the oil seals 28 and 29 or the dust seals 32 and 33. The second oil grooves 36 can be formed at the time the individual rod guides 12 and 13 are cast. This embodiment consequently does not require a complex step of forming the individual oil grooves 35 and 36, and thus allows for a reduction in manufacturing costs accordingly in contrast to the prior art in which oblique holes have to be formed.

According to this embodiment, in particular, the first oil groove 35 is formed in an annular shape in the entire inner surface of each of the rod guides 12 and 13. Although two second oil grooves 36 are provided to connect the oil inlet port 21, 24 to the pressure chambers 18, 19 through two passages, a single first oil groove 35 is sufficient. Even in this case, therefore, the structures of the oil passages 23 and 26 can be simplified.

As described above, the piston rod 14 is supported by the rod guides 12 and 13 via the bushes 37. The bushes 37 are formed of a material which has a lower rigidity and a lower frictional coefficient than gray cast iron which is the material for the rod guides 12 and 13. At the time the piston rod 14 slides, any damage or wear to the piston rod's sliding portion is prevented according to this embodiment. This is in marked contrast to the prior art in which the piston rod 55 is supported directly by the rod guides 53 and 54. Accordingly, this improves the durability of the entire rear axle cylinder 8 as well as the piston rod 14.

PTFE, a kind of fluororesin, is in particular used as the molding material for the bushes 37 in this embodiment. Therefore, damage and wear to the piston rod 14 can be reduced compared with the case where the bushes 37 are formed of metal.

The bush 37 does not have a sufficient strength itself. Its strength is however reinforced by the rod guide 12 or 13 around the bush 37. The piston rod 14 is therefore slidably supported by the rod guides 12 and 13.

It should be noted that the present invention is not limited to the above-described embodiment, but may be embodied in the following manners.

1) The material used for the bushes 37 may be other than fluororesin. The material to be selected should have a lower rigidity and a lower frictional coefficient than the rod guides 12 and 13. Such materials include gun metal and phosphor bronze, for example.

2) Most portions of the bush 37 may be formed of a material other than a fluororesin. For example, a layer of a fluororesin may be formed on the inner surface of the bush 37 against which the piston rod 14 slides.

3) The number of the second oil grooves 36 at each of the rod guides 12 and 13 may be changed to three or more.

4) The positions in the first oil groove 35 where the second oil grooves 36 are formed may be changed to different positions than those in the above-described embodiment. The positions may be set apart by an angle different from 90 degrees, from the opening portions of the oil inlet ports 21 and 24 in the oil groove 35. In this case, if there are a plurality of second oil grooves 36, it is preferable that those oil grooves 36 be provided symmetrical to the axis L of the piston rod 14. This can permit the hydraulic fluids to flow evenly between the oil inlet ports 21 and 24 and the compression chambers 18 and 19.

5) Although the second oil grooves 36 are formed in parallel to the axis L of the piston rod 14 in the above-described embodiment, they need not necessarily be parallel.

6) The annular first oil groove 35 may be modified to have an arc shape. That is, the bottom half of the first oil groove 35 shown in FIG. 3 may be omitted. The point is that the vertical hole 21a, 24a should communicate with the second oil grooves 36 via the first oil groove 35. This modification further facilitates the formation of the first oil groove 35 in contrast to the case where the first oil groove 35 is formed having an annular shape.

7) This invention may be applied to general hydraulic cylinders as well as the rear axle cylinder 8 in an industrial vehicle.

8) Although the first oil groove 35 and second oil grooves 36 are formed in the inner surfaces of the rod guides 12 and 13 in the above-described embodiment, those grooves may be formed in the outer surfaces of the bushes 37. Further, the grooves 35 and 36 may be formed in the inner surfaces of the rod guides 12 and 13 and the outer surfaces of the bushes 37.

9) The first oil groove 35 in the above-described embodiment may be omitted and the oil passages 23 and 26 may be formed relative only to the second oil grooves 36. With a single second oil groove 36, the opening portion of the vertical hole 21a, 24a in the inner surface of the rod guide 12, 13 should directly connect to one of the pressure chambers 18 and 19 via the oil groove 36. This would simplify the oil passages 23 and 26 and allow their manufacture at lower costs than passages in the above-described embodiment.

We claim:

1. A hydraulic cylinder having a cylinder tube and a pair of rod guides respectively provided at opposite ends of the cylinder tube, wherein a piston rod is mounted in the cylinder tube and the rod guides for reciprocation relative to said cylinder tube and rod guides in accordance with changes of pressure of hydraulic fluids in a pair of pressure chambers, said hydraulic cylinder further comprising:

an individual bushing provided between the piston rod and each of the rod guides for enabling the piston rod to slide within the cylinder tube and rod guides, said bushings having a uniform unbroken outer cylindrical surface;

said rod guides having oil inlet ports open to outer surfaces of said rod guides and extending linearly inward in a radial direction of the cylinder tube to communicate with inner circumferential surfaces of said rod guides and said outer surfaces of said bushings, said oil inlet ports having means for connection to an external source of oil; and oil passages formed in the rod guides for connecting the oil inlet ports to a respective one of said pressure chambers.

2. The hydraulic cylinder according to claim 1, wherein the inner circumferential surface of each rod guide has grooves for forming the oil passages.

3. The hydraulic cylinder according to claim 1, wherein said rod guides are formed of gray cast iron, and said bushings are formed of fluororesin.

4. The hydraulic cylinder according to claim 2, wherein said oil grooves include a first oil groove extending along the inner circumferential surface of each rod guide, and a second oil groove formed parallel to the axis of the piston rod for connecting said first oil groove to the associated pressure chamber.

5. The hydraulic cylinder according to claim 4, wherein each of said first oil grooves extends along the entire circumference of the inner circumferential surface of each rod guide.

6. The hydraulic cylinder according to claim 4, wherein each of said first oil grooves is formed in an arc shape extending along the inner circumferential surface of each rod guide.

7. The hydraulic cylinder according to claim 4, wherein said second oil groove is formed 90 degrees away from an opening portion of the associated oil inlet port in each first oil groove.

8. The hydraulic cylinder according to claim 1, further comprising oil seals provided between the rod guides and the piston rod opposed to the pressure chambers for preventing hydraulic fluids in the pressure chambers from leaking past said rod guides.

9. The hydraulic cylinder according to claim 1, further comprising dust seals provided between said rod guides and said piston rod opposed to said pressure chambers for preventing dust from entering said pressure chambers through said rod guides.

10. A hydraulic cylinder used in a hydraulic power steering system for a vehicle, having a cylinder tube and a pair of rod guides respectively provided at opposite ends of the cylinder tube, wherein a piston rod is mounted in the cylinder tube and the rod guides for reciprocation relative to said cylinder tube and rod guides in accordance with changes of pressure of hydraulic fluids in a pair of pressure chambers, said hydraulic cylinder further comprising:

an individual bushing provided between the piston rod and each of the rod guides for enabling the piston rod to slide within the cylinder tube and rod guides, said bushings having a uniform unbroken outer cylindrical surface;

said rod guides having oil inlet ports open to outer surfaces of said rod guides from inner circumferential surfaces thereof, said oil inlet ports having means for connection to an external source of oil; and oil passages formed as grooves in the inner circumferential surface of each rod guide for connecting the oil inlet ports to a respective one of said pressure chambers.

11. The hydraulic cylinder according to claim 10, wherein said oil grooves include a first oil groove extending along the inner circumferential surface of each rod guide, and a second oil groove formed parallel to the axis of the piston rod for connecting said first oil groove to the associated pressure chamber.

12. The hydraulic cylinder according to claim 11, wherein each of said first oil grooves extends along the entire circumference of the inner circumferential surface of each rod guide.

13. The hydraulic cylinder according to claim 11, wherein said second oil groove is formed 90 degrees away from an opening portion of the associated oil inlet port in each first oil groove.

14. The hydraulic cylinder according to claim 10, further comprising oil seals provided between the rod guides and the piston rod opposed to the pressure chambers for preventing hydraulic fluids in the pressure chambers from leaking past said rod guides, and dust seals provided between said rod guides and said rod opposed to said pressure chambers for preventing dust from entering said pressure chambers through said rod guides.

15. A hydraulic cylinder used in a hydraulic power steering system for a vehicle, having a cylinder tube and a pair of rod guides respectively provided at opposite ends of the cylinder tube, said cylinder tube being attached to an axle beam of said vehicle, a piston rod mounted in the cylinder tube and the rod guides for reciprocation relative to said cylinder tube and rod guides in accordance with changes of pressure of hydraulic fluid in a pair of pressure chambers, said piston rod having opposite ends coupled respectively to wheels of said vehicle, said hydraulic cylinder further comprising:

an individual bushing provided between the piston rod and each of the rod guides for enabling the piston rod to slide within the cylinder tube and rod guides, said bushings having a uniform unbroken outer cylindrical surface;

said rod guide having oil inlet ports open to outer surfaces of the rod guides from inner circumferential surfaces thereof, and connected to an external source of oil; and oil passages formed as grooves in the inner circumferential surface of each rod guide for connecting the oil inlet ports to a respective one of said pressure chambers.

16. The hydraulic cylinder according to claim 15, wherein said oil grooves include:

a first oil groove extending along the entire circumference of the inner circumferential surface of each rod guide and communicating with the respective oil inlet port; and a plurality of second oil grooves formed in each rod guide parallel to the axis of the piston rod for connecting each first oil groove to the associated pressure chamber, said second oil grooves in each rod guide being provided spaced 90 degrees away from on both sides of the point of communication between said first oil groove and the associated oil inlet port.

17. A hydraulic cylinder having a cylinder tube and a pair of rod guides respectively provided at both ends of the cylinder tube, wherein a piston rod is inserted in the cylinder tube and the rod guides for reciprocation in accordance with changes of pressure of hydraulic fluids in a pair of pressure chambers, said hydraulic cylinder comprising:

bushings respectively provided between the piston rod and the rod guides for enabling the piston rod to slide along the cylinder tube therein;

said rod guides having oil inlet ports open to outer surfaces of said rod guides and linearly extending inward in a radial direction of the cylinder tube to communicate with inner circumferential surfaces of said rod guides, said oil inlet ports having means for connection to an external device; and oil passages formed in the rod guides and the bushings for connecting the oil inlet ports to the pressure chambers, at least a selected one from the group consisting of the inner circumferential surface of each rod guide and an outer surface of each bushing has grooves for forming said oil passages, said oil grooves including a first oil groove extending along the inner circumferential surface of each rod guide, and a second oil groove formed parallel to the axis of the piston rod for connecting said first oil groove to the associated pressure chamber, said second oil groove being formed 90 degrees away from an opening portion of the associated oil inlet port in each first oil groove.

18. A hydraulic cylinder used in a hydraulic power steering system for a vehicle, having a cylinder tube and a pair of rod guides respectively provided at opposite ends of the cylinder tube, wherein a piston rod is mounted in the cylinder tube and the rod guides for reciprocation relative to said cylinder tube and rod guides in accordance with changes of pressure of hydraulic fluids in a pair of pressure chambers, said hydraulic cylinder further comprising:

bushings respectively provided between the piston rod and each of the rod guides for enabling the piston rod to slide relative to the cylinder tube and rod guides;

said rod guides having oil inlet ports open to outer surfaces of said rod guides from inner circumferential surfaces thereof, said oil inlet ports having means for connection to an external device; and oil passages formed as grooves in at least a selected one from a group consisting of the inner circumferential surface of each rod guide and an outer surface of each bushing, for connecting the oil inlet ports to a respective one of said pressure chambers, said oil grooves including a first oil groove extending along the inner circumferential surface of each rod guide, and a second oil groove formed parallel to the axis of the piston rod for connecting said first oil groove to the associated pressure chamber, said second oil groove being formed 90 degrees away from an opening portion of the associated oil inlet port in each first oil groove.

* * * * *